United States Patent
Inami et al.

(10) Patent No.: US 6,920,481 B2
(45) Date of Patent: Jul. 19, 2005

(54) COMMUNICATIONS TERMINAL

(75) Inventors: Satoshi Inami, Moriguchi (JP); Masashige Mizuyama, Neyagawa (JP); Atsunobu Kato, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 739 days.

(21) Appl. No.: 10/046,184

(22) Filed: Jan. 16, 2002

(65) Prior Publication Data

US 2002/0099805 A1 Jul. 25, 2002

(30) Foreign Application Priority Data

Jan. 19, 2001 (JP) .......................... 2001-011253

(51) Int. Cl.[7] .............................................. G06F 15/16
(52) U.S. Cl. ..................... 709/203; 709/201; 709/217; 709/218; 709/219; 713/200; 713/201; 713/202; 713/168
(58) Field of Search ................................. 709/201, 203, 709/217–219; 713/200–202, 152, 168; 717/168, 171

(56) References Cited

U.S. PATENT DOCUMENTS 6,141,759 A * 10/2000 Braddy ....................... 713/201

FOREIGN PATENT DOCUMENTS

| EP | 0 811 942 | 12/1997 |
|---|---|---|
| JP | 3184869 | 4/2001 |

OTHER PUBLICATIONS

Droms R. et al., "Authentication for DHCP Messages", Network Working Group, Aug. 1998, XP002188115. Retrieved from the Internet: <URL: http://www.ietf.org/proceedings/98aug/I–D/draft–ietf–dhc–authentication–08.txt>, retrieved on Jan. 23, 2002.

Anand R. et at., "A Flexible Security Model for Using Internet Content", Reliable Distributed Systems, IEEE Comput. Soc, USA, pp. 89–96, Oct. 1997, XP010254987.

* cited by examiner

Primary Examiner—Jack B. Harvey
Assistant Examiner—Hieu Le
(74) Attorney, Agent, or Firm—Wenderoth, Lind & Ponack, L.L.P.

(57) ABSTRACT

In a communications terminal 3, a CPU 32 retrieves start-up data 112 from a server 1 using a Web browser 311, which is stored in a storage device 31. The CPU 32 performs data authentication with respect to authentication type data 1123 included in the start-up data 112. Then, when the authentication is succeeded, the CPU 32 follows the authentication type data 1123 so as to determine which authentication mode is to be used for authenticating the application data. In this manner, the authentication mode for authenticating the application data can be easily changed.

10 Claims, 12 Drawing Sheets

Fig. 9

| APPLICATION NAME | TYPE | AUTHENTICATION MODE |
|---|---|---|
| A1 | C | DES CRYPTOSYSTEM |
| A2 | P | CERTIFICATE |
| A3 | J | DIGITAL WATERMARKING |
| ⋮ | ⋮ | ⋮ |

315

COMMUNICATIONS TERMINAL

BACKGROUND OF THE INVENTION

1. Field of the Invention

The present invention relates to communications terminals and, more specifically, to communications terminals which receive data for their internal start-up of applications, and perform data authentication as to the received data.

2. Description of the Background Art

In a conventional system structured by a server and terminals, data is forwarded from the server to the corresponding terminal for application execution therein. For a game application, for example, the server may forward data including information about any other users and game settings to the corresponding terminal for its game play. Such data is continuously updated on the server side to be ready for a data request coming from the terminal side prior to game play, and thus the game data does not fail to be the latest.

Such a system requires data authentication to see whether the data coming from the server has been tampered or not. The terminal thus accordingly goes through data authentication by digital signature, digital watermarking, or the like, to verify the identity of the data, or the possibility of data tampering, for example.

An exemplary system for verifying the authenticity of Web pages has been disclosed in Japanese Patent Laid-Open Publication No. 2000-227757. Data authentication in this Publication is performed with respect to contents derived by the server using a Web browser.

The issue here is, a program for data authentication is often incorporated in an application, or have some relevance to any specific application. That is, an application and a data authentication program have a one-to-one relationship, which is unalterably established. Thus, changing the authentication mode for any specific application means newly installing a program therefor.

As such, in the conventional system for data authentication, changing authentication modes on an application basis has been very troublesome. What is worse, if the program is of a type incorporated in the application, the application has to be troublingly installed also.

SUMMARY OF THE INVENTION

Therefore, an object of the present invention is to provide data authentication systems allowing easy change of authentication modes.

The present invention has the following features to attain the object above.

A first aspect of the present invention is directed to a communications terminal for transmitting/receiving data to/from a server over a network, comprising:

a data request section for making a data request for the server to forward start-up data which includes application data relating to start-up of an application, and authentication type data indicating an authentication mode for authenticating the application data;

a data reception section for receiving the start-up data coming from the server in response to the data request;

a first authentication section for authenticating the authentication type data received by the data reception section under a predetermined authentication mode;

a second authentication section for authenticating, corresponding to the first authentication section succeeding in authentication, the application data received by the data reception section under an authentication mode indicated by the authentication type data which has been done with authentication; and an application start-up section for reading, corresponding to the second authentication section succeeding in authentication, the application data which has been done with authentication, and starting up the application As described above, in the first aspect, the server forwards the authentication type data together with the application data. The authentication type data is then used by the communications terminal as the basis for determining an authentication mode for the application data. Therefore, the authentication mode can be changed easily.

Further, in the first aspect, the authentication type data has a possibility of data tampering as does the application data because those data are forwarded together. If the authentication type data has been tampered, the application data cannot be correctly authenticated, allowing any unauthorized data possibly to be read into the application. In the first embodiment, however, the authentication type data is authenticated separately from the application data. Therefore, if the authentication type data fails to be authenticated, the corresponding application is not started up. In such a manner, even if the application data is not correctly authenticated due to data tampering done to the authentication type data, the corresponding application is prevented from starting up due to any unauthorized data.

According to a second aspect, in the first aspect, the communication terminal further comprises an application information storage section for storing application information which indicates a correspondence between the application and the authentication mode used for authenticating the application data relating to the application, wherein when the start-up data has none of the authentication type data, the second authentication section determines the authentication mode based on the application information.

As described above, in the second aspect, in response to no authentication type data coming from the server, the communications terminal performs data authentication under a predetermined mode found in the application information. Therefore, if the authentication mode is not changed, the server has no need to forward the authentication type data, successfully reducing the data amount for transmission. The communications terminal has also a merit of being reduced in processing burden because there needs to go through the authentication process for only once if the authentication mode is not changed.

According to a third aspect, in the first aspect, by designating the application data stored in the server using a Web browser, the data request section makes the data request for the application data.

As described above, in the third aspect, the data request is easily made to the server through a user's simple operation, clicking link information using a Web browser, for example. Especially with the communications terminal of a mobile type often having an input device simple in structure, simple operation for making data requests to the server is advantageous.

A fourth aspect of the present invention is directed to a communications terminal for transmitting/receiving data to/from a server over a network, comprising:

a data request section for making a data request for the server to forward start-up data which at least includes application data relating to execution of an application;

a data reception section for receiving the start-up data coming from the server in response to the data request;

an application information storage section for storing application information which indicates a correspondence between the application and an authentication mode used for authenticating the application data relating to the application;

an authentication section for authenticating the start-up data received by the data reception section under an authentication mode indicated by the application information;

an application start-up section for reading, corresponding to the authentication section succeeding in authentication, the application data which has been done with authentication, and starting up the application; and under a condition that the start-up data includes both the application data and authentication type data which indicates an authentication mode used for authenticating the application data, an application information update section for updating, corresponding to the authentication section succeeding in authentication, the authentication mode in the application information stored in the application information storage section into the authentication mode indicated by the authentication type data which has been done with authentication.

As described above, in the fourth aspect, the server forwards the authentication type data together with the application data. The communications terminal performs data authentication first in accordance with the application information which is previously stored, and when the authentication worked out, the application information is correspondingly changed based on the authentication type data. Accordingly, by the time when the start-up data comes next, the authentication type data will be changed in authentication mode. As such, the authentication mode can be easily changed by the authentication type data.

A fifth aspect of the present invention is directed to a network system including a server and a communications terminal for data transmission/reception therebetween over a network, wherein the server comprises:

a start-up data storage section for storing start-up data which includes application data relating to execution of an application, and authentication type data indicating an authentication mode used for authenticating the application data; and a data transmission section for forwarding the start-up data stored in the start-up data storage section in response to a data request for the start-up data coming from the communications terminal, and the communications terminal comprises:

a data request section for making the data request for the start-up data;

a data reception section for receiving the start-up data coming from the server in response to the data request;

a first authentication section for authenticating the authentication type data received by the data reception section under a predetermined authentication mode;

a second authentication section for authenticating, corresponding to the first authentication section succeeding in authentication, the application data received by the data reception section under the authentication mode indicated by the authentication type data which has been done with authentication; and an application start-up section for reading, corresponding to the second authentication section succeeding in authentication, the application data which has been done with authentication, and starting up the application.

A sixth aspect of the present invention is directed to a network system including a server and a communications terminal for data transmission/reception therebetween over a network, wherein the server comprises:

a start-up data storage section for storing start-up data which at least includes application data relating to execution of an application; and a data transmission section for forwarding the start-up data stored in the start-up data storage section in response to a data request for the start-up data coming from the communications terminal, and the communications terminal comprises:

a data request section for making the data request for the start-up data;

a data reception section for receiving the start-up data coming from the server in response to the data request;

an application information storage section for storing application information which indicates a correspondence between the application and an authentication mode used for authenticating the application data relating to the application, an authentication section for authenticating the start-up data received by the data reception section under the authentication mode indicated by the application information;

an application start-up section for reading, corresponding to the authentication section succeeding in authentication, the application data which has been done with authentication, and starting up the application; and under a condition that the start-up data includes both the application data and authentication type data which indicates an authentication mode used for authenticating the application data, an application information update section for updating, corresponding to the authentication section succeeding in authentication, the authentication mode in the application information stored in the application information storage section into the authentication mode indicated by the authentication type data which has been done with authentication.

A seventh aspect of the present invention is directed to a computer program embodied on a computer readable medium, the computer program for use with a computer operable in a communications terminal for transmitting/receiving data to/from a server over a network, the program comprising:

a data request step of making a data request for the server to forward start-up data which includes application data relating to start-up of an application, and authentication type data indicating an authentication mode for authenticating the application data;

a data reception step of receiving the start-up data coming from the server in response to the data request;

a first authentication step of authenticating the authentication type data received in the data reception step under a predetermined authentication mode;

a second authentication step of authenticating, corresponding to the first authentication step succeeding in authentication, the application data received in the data reception step under an authentication mode indicated by the authentication type data which has been done with authentication; and an application start-up step of reading, corresponding to the second authentication step succeeding in authentication, the application data which has been done with authentication, and starting up the application.

An eighth aspect of the present invention is directed to a computer program embodied on a computer readable medium, the computer program for use with a computer operable in a communications terminal for transmitting/receiving data to/from a server over a network, the program comprising:

the communications terminal previously includes application information which indicates a correspondence between an application and an authentication mode used for authenticating application data relating to the application,
the program comprising:

a data request step of making a data request for the server to forward start-up data which at least includes the application data relating to execution of the application;

a data reception step of receiving the start-up data coming from the server in response to the data request;

an authentication step of authenticating the start-up data received in the data reception step under the authentication mode indicated by the application information;

an application start-up step for reading, corresponding to the authentication step succeeding in authentication, the application data which has been done with authentication, and starting up the application; and under a condition that the start-up data includes both the application data and authentication type data which indicates an authentication mode used for authenticating the application data, an application information update step of updating, corresponding to the authentication step succeeding in authentication, the authentication mode in the application information which has been previously included into the authentication mode indicated by the authentication type data which has been done with authentication.

A ninth aspect of the present invention is directed to a data authentication method used in a communications terminal for transmitting/receiving data to/from a server over a network, comprising:

a data request step of making a data request for the server to forward start-up data which includes application data relating to start-up of an application, and authentication type data indicating an authentication mode for authenticating the application data;

a data reception step of receiving the start-up data coming from the server in response to the data request;

a first authentication step of authenticating the authentication type data received in the data reception step under a predetermined authentication mode;

a second authentication step of authenticating, corresponding to the first authentication step succeeding in authentication, the application data received in the data reception step under an authentication mode indicated by the authentication type data which has been done with authentication; and an application start-up step of reading, corresponding to the second authentication step succeeding in authentication, the application data which has been done with authentication, and starting up the application.

A tenth aspect of the present invention is directed to a data authentication method used in a communications terminal for transmitting/receiving data to/from a server over a network, the communications terminal previously includes application information which indicates a correspondence between an application and an authentication mode used for authenticating application data relating to the application,
the method comprising:

a data request step of making a data request for the server to forward start-up data which at least includes the application data relating to execution of the application;

a data reception step of receiving the start-up data coming from the server in response to the data request;

an authentication step of authenticating the start-up data received in the data reception step under the authentication mode indicated by the application information;

an application start-up step for reading, corresponding to the authentication step succeeding in authentication, the application data which has been done with authentication, and starting up the application; and under a condition that the start-up data includes both the application data and authentication type data which indicates an authentication mode used for authenticating the application data, an application information update step of updating, corresponding to the authentication step succeeding in authentication, the authentication mode in the application information which has been previously included into the authentication mode indicated by the authentication type data which has been done with authentication.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 exemplarily shows an application information table of FIG. 3;

DESCRIPTION OF THE PREFERRED EMBODIMENT

Figure 1:
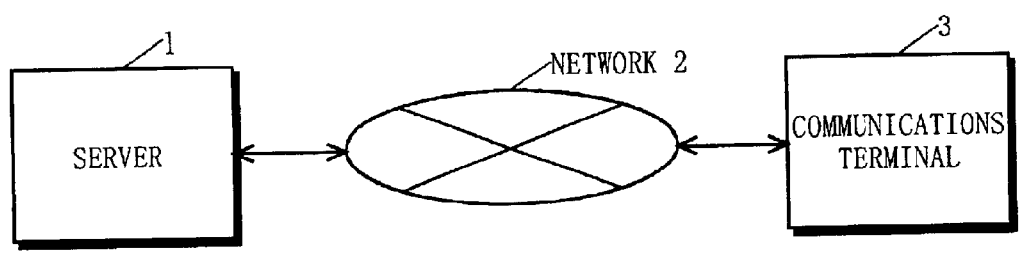
FIG. 1 is a block diagram showing the structure of a data authentication system according to one embodiment of the present invention.

In the below, described is one embodiment of the present invention by referring to the accompanying drawings. FIG. 1 is a block diagram showing the structure of a data authentication system according to the embodiment of the present invention. In FIG. 1, the data authentication system includes a server 1, a network 2, and a communications terminal 3. The server 1 and the communications terminal 3 are connected to each other via the network 2 for communications therebetween. Here, the network 2 may be either wired or wireless.

Figure 2:
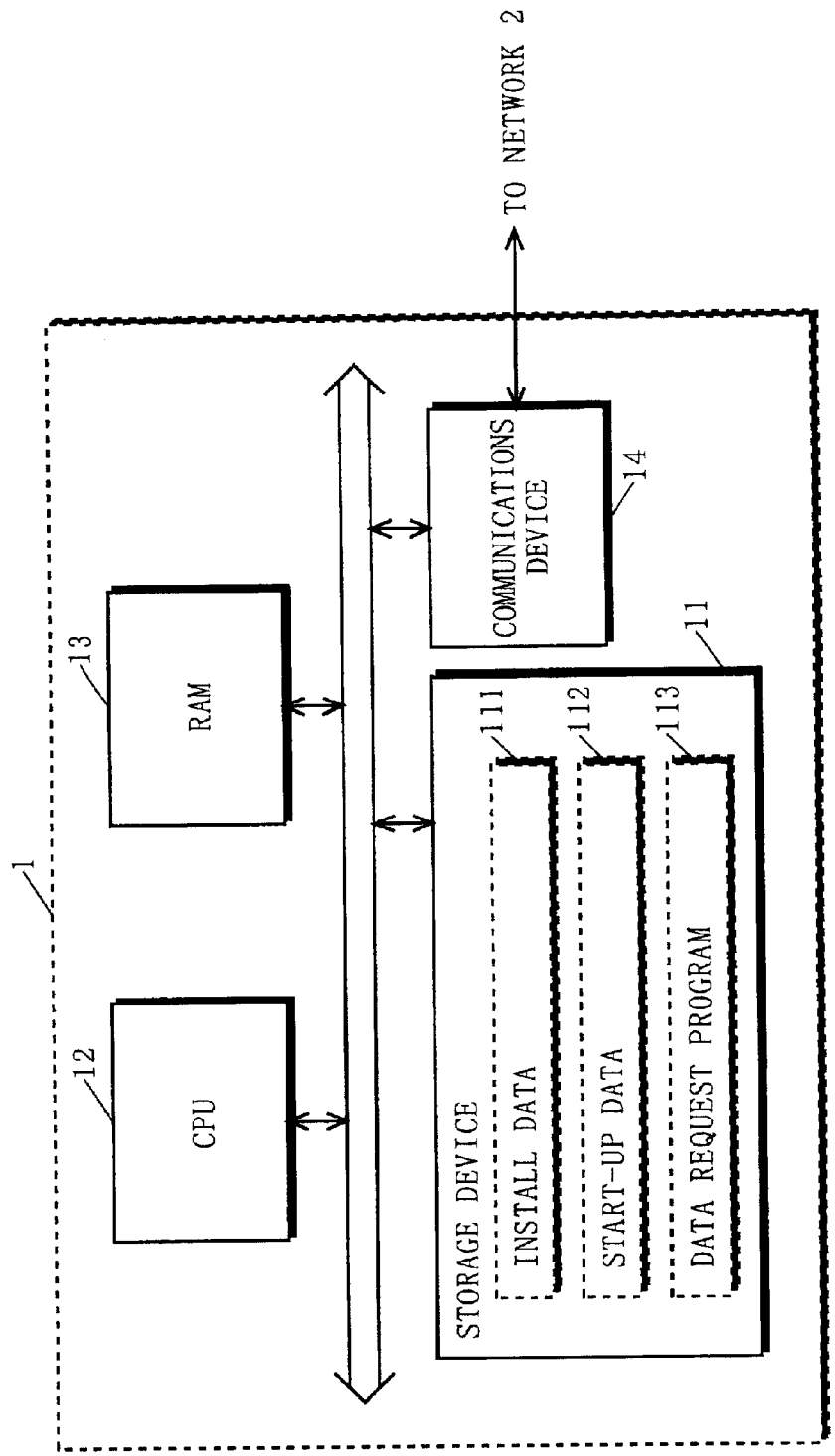
FIG. 2 is a block diagram showing the hardware structure of a server 1 of FIG. 1.

FIG. 2 is a block diagram showing the hardware structure of the server 1 of FIG. 1. The server 1 is a so-called WWW (World Wide Web)server. As shown in FIG. 2, the server 1 is provided with a storage device 11, a CPU 12, RAM 13, and a communications device 14.

The storage device 11 is composed of a hard disk drive, ROM, or the like, and stores install data 111 and start-up data 112, at least one piece of each. The install data 111 includes a program which is downloaded and installed by the communications terminal 3, and information about the program. The start-up data 112 has some relevance to application start-up, and forwarded to the communications terminal 3 for its application start-up. The communications terminal 3 requests, for its application execution, the server 1 for the start-up data.

For processing such a data request, the storage device 11 stores a program (data request program) 113. Responding to any data request coming from the communications terminal 3, the start-up data 112 is forwarded thereto in accordance with the data request program 113. Here, the storage device 11 stores some other programs required in the present embodiment.

The CPU 12 executes the programs stored in the storage device 11 while using the RAM 13 as a working area. The communications device 14 communicates with the communications terminals 3 over the network 2.

Figure 3:
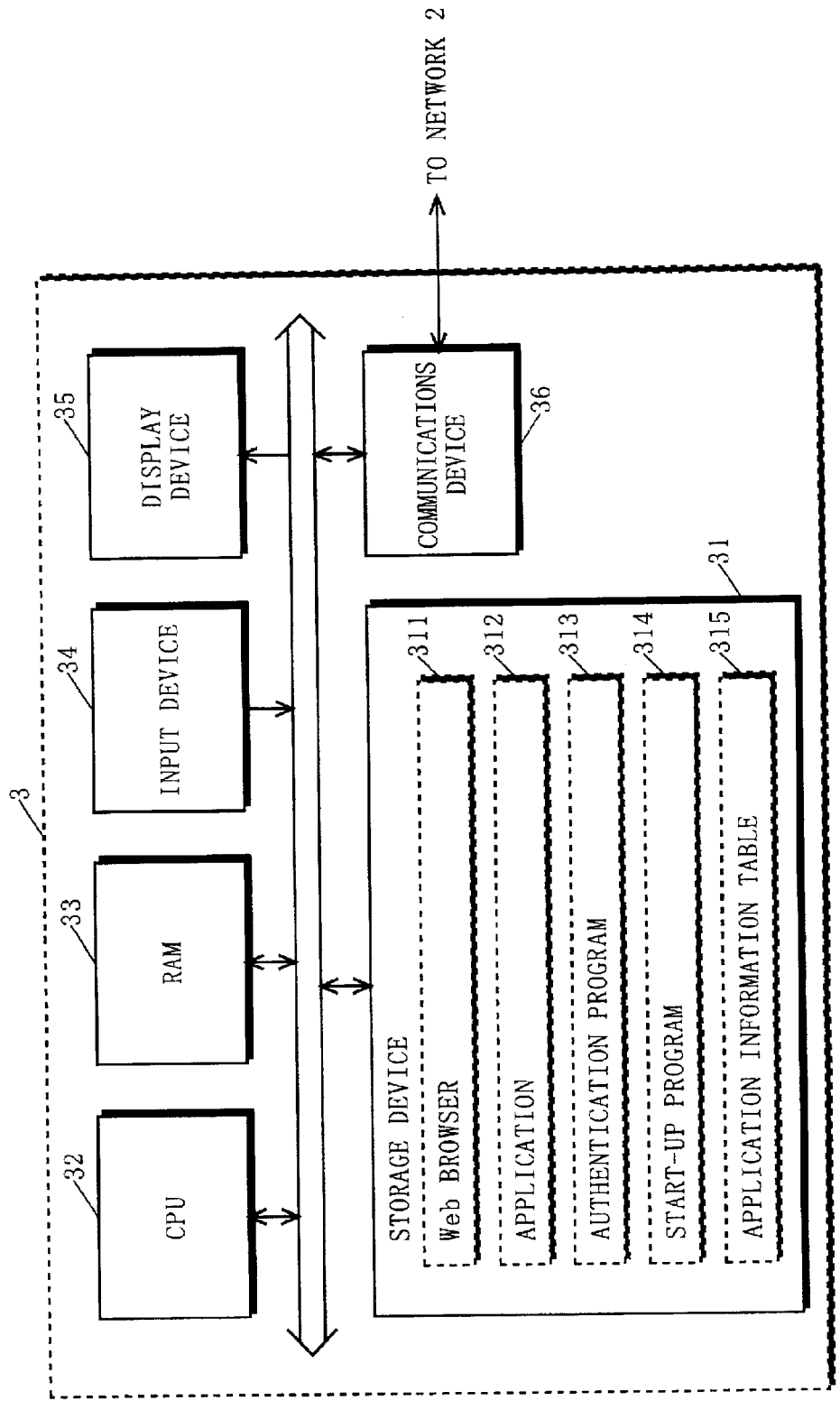
FIG. 3 is a block diagram showing the hardware structure of a communications terminal 3 of FIG. 1.

FIG. 3 is a block diagram showing the hardware structure of the communications terminal 3 of FIG. 1. As shown in FIG. 3, the communications terminal 3 includes a storage device 31, a CPU 32, RAM 33, an input device 34, a display device 35, and a communications device 36.

The storage device 31 stores a Web browser 311, an application 312, an authentication program 313, an application start-up program 314, and an application information table 315. Here, stored in the storage device 31 are not limited to those, and some other programs required in the present embodiment are also stored.

The Web browser 311 is a program for retrieving contents from the server 1, and subjecting those to a display process, for example. In the present embodiment, the communications terminal 3 accesses the network 2 using the Web browser 311 for data transmission/reception to/from the server 1.

The application 312 is a program to be executed in the communications terminal 3. Here, the storage device 31 also stores several other such programs. Assuming here that whatever applications stored in the storage device 31 require some data from the server 1 for their start-up. For example, with a game application, received from the server 1 may be data including information about other users, game difficulty, or the like. With a scheduling application, received from the server 1 may be data including the user's schedule.

The authentication program 313 is provided for authenticating the data coming from the server 1, specifically, verifying the identity of the data, and the possibility of data tampering. It should be noted here that, stored in the storage device 31 is not limited to the authentication program 313, and several other programs are also stored for data authentication.

The application start-up program 314 is provided for a process to be executed at the time of application start-up. The application information table 315 shows, on an application basis, what type of data is to be read and what application mode is to be applied for application start-up.

The CPU 32 executes the programs stored in the storage device 31 while using the RAM 33 as a working area. The input device 34 is composed of a keyboard, for example, and inputs user's commands at the time of application execution. The display device 35 is composed of a liquid crystal display, for example, and displays Web pages retrieved using the Web browser, the execution result of the application, and the like. The communications device 36 communicates with the server 1 over the network 2.

Described next is the operation of the communications terminal 3 for application execution in the data authentication system of the present embodiment. In this embodiment, the CPU 32 of the communications terminal 3 executes the Web browser 311 to access the network 2 for data transmission/reception to/from the server 1. Therefore, it is here assumed that the Web browser 311 is activated at the time of application execution. To be specific, by the time of application execution, the display device 35 will display a Web page received from the server 1 using the Web browser 311. Assuming below is a case where the application 312 is to be executed, and for data authentication, the authentication program 313 is to be executed.

Figure 4:
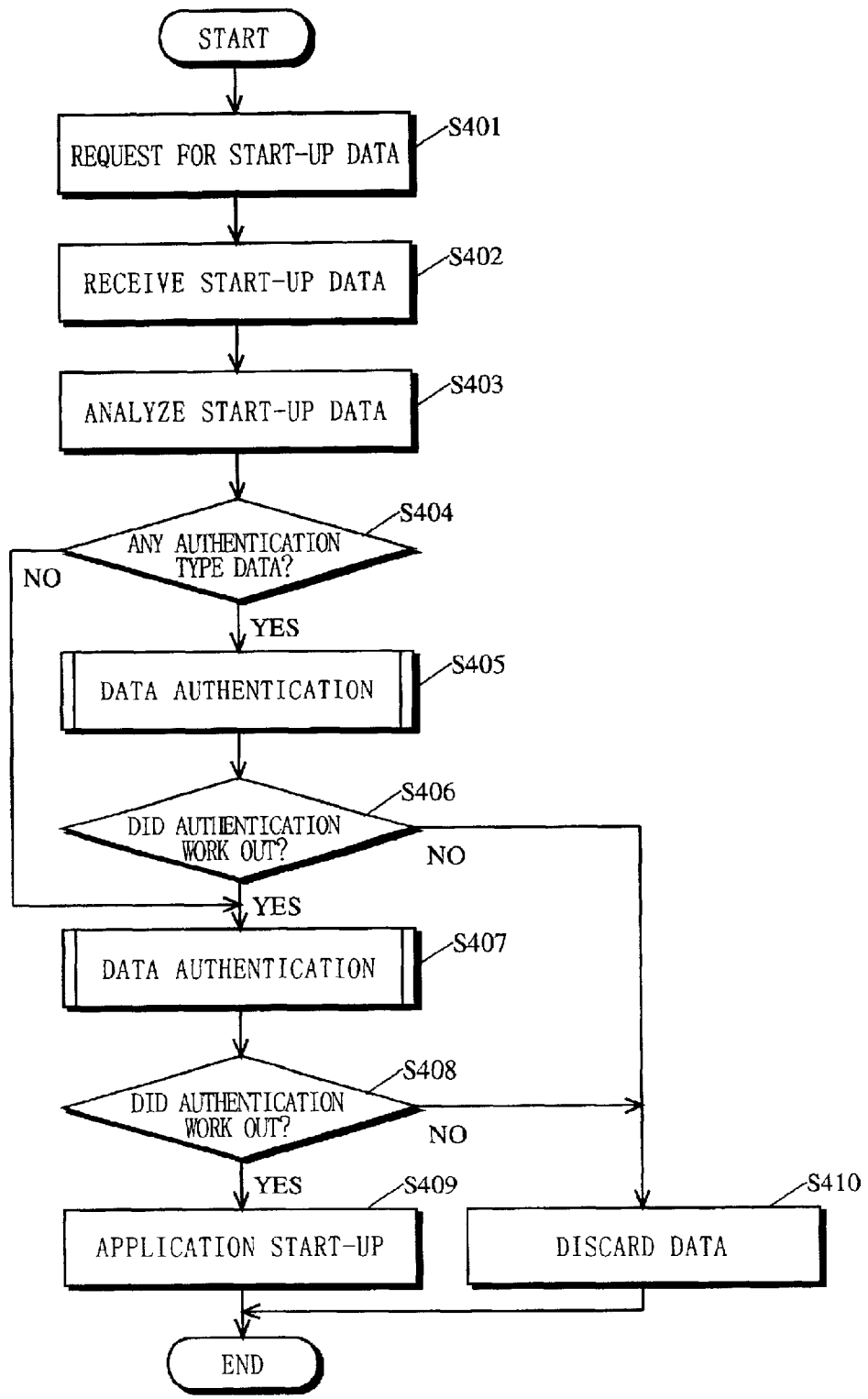
FIG. 4 is a flowchart of an application start-up process in the communications terminal 3 of FIG. 1.

FIG. 4 is a flowchart of an application start-up process in the communications terminal 3 shown in FIG. 1. The application start-up process is executed by the CPU 32 of the communications terminal 3 executing the application start-up program 314. First, the CPU 32 requests the server 1 for the start-up data, which is described in the foregoing (step S401). This data request is made through the input device 34, responding to the user's selecting anchor information on the Web page displayed as links. In other words, the CPU 32 goes through step S401 in response to user's operation as such. Here, the data request made in step S401 includes a URL (Uniform Resource Locator) which indicates the location of the start-up data. The anchor information is displayed on the Web page under an application name, and related to the start-up data for the application.

The data request made in step S401 is forwarded by the communications device 36 to the server 1 over the network 2. The data request thus received by the server 1 is transferred to the CPU 12 by the communications device 14. In response, the CPU 12 starts a process with respect to the data request.

Figure 5:
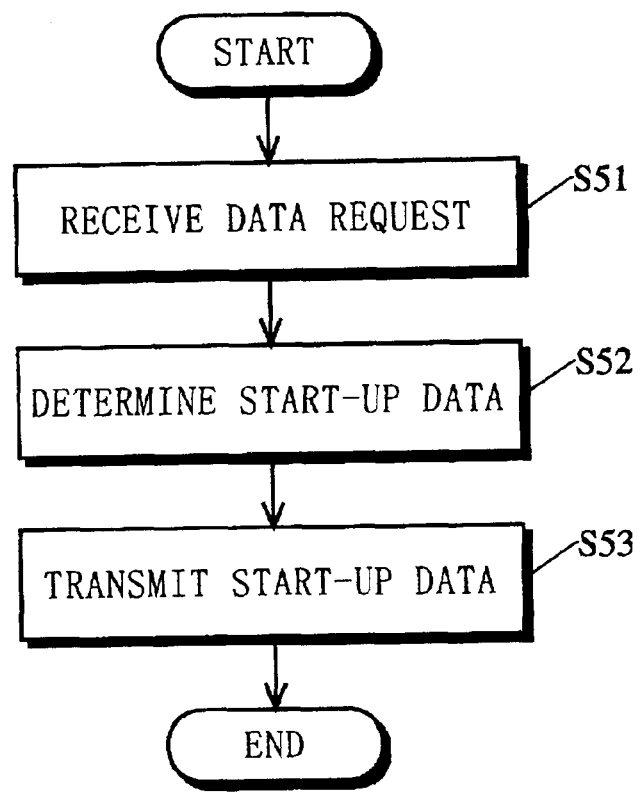
FIG. 5 is a flowchart of a sequence of processes performed by a CPU 12 of FIG. 2 responding to a data request.

FIG. 5 is a flowchart of a sequence of processes executed by the CPU 12 of FIG. 2 responding to the data request. Here, this process is executed by the CPU 12 of the server 1 whichever executing the data request program 113. The CPU 12 first receives the data request (step S51), and then determines which start-up data is to be forwarded to the communications terminal 3, from which the data request came (step S52). As already described, the storage device 11 of the server 1 previously stores the start-up data on the application basis. In step S52, any corresponding start-up data is selected from among those stored in the storage device 11 based on the URL included in the data request. In the below, a specific example of the start-up data is described.

Figure 6:
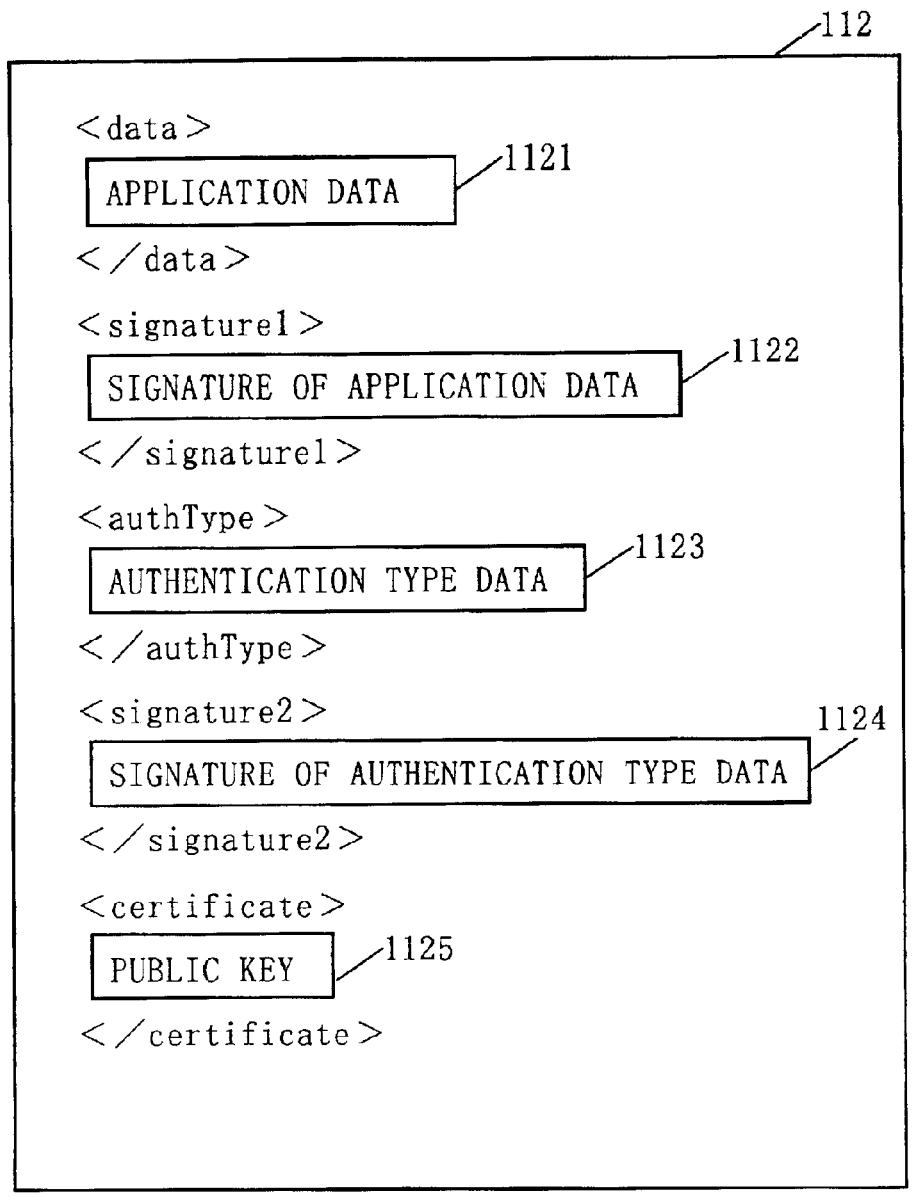
FIG. 6 shows exemplary start-up data in the embodiment.

FIG. 6 shows an example of the start-up data in the present embodiment. In FIG. 6, the start-up data 112 includes application data 1121, a signature of the application data 1122, authentication type data 1123, a signature of the authentication type data 1124, and a public key 1125. The application data 1121 is the one read into the application 312 at the time of its start-up. The application data 1121 being a game specifically includes information about other users and game difficulty, for example. When being scheduling software, the application data 1121 may be user's schedule information. The signature of the application data 1121 proves that the application data 1121 forwarded from the server 1 has not been tampered. Here, the signature of the application data 1122 is the one derived by calculating a hash value of the application data 1121 in the server 1. The signature of the application data 1121 is encrypted for transmission.

The authentication type data 1123 indicates an authentication mode for the application data 1121. The application data 1121 is encrypted under the authentication mode indicated by this authentication type data 1123. The signature of the authentication type data 1124 proves that the authentication type data 1123 forwarded from the server 1 has not been tampered. Here, the signature of the authentication type two data 1124 is the one derived by calculating a hash value of the authentication type data in the server 1. The signature of the authentication type data 1124 is encrypted for transmission.

Here, unlike the application data 1121 to be authenticated under any mode depending on the authentication type data 1123, the authentication type data 1123 has to be authenticated under one predetermined mode. Herein, the authentication type data 1123 is presumably authenticated under a public key cryptosystem. This is the reason why the start-up data 112 herein is provided with the public key 1125, for decryption.

Referring back to FIG. 5, after step S52 is through, the CPU 12 reads the start-up data 112 stored in the storage device 11 for transmission to the communications terminal 3 (step S53). Specifically, the CPU 12 transfers the start-up data 112 to the communications device 14, and the communications device 14 responsively forwards the start-up data 112 to the communications terminal 3 over the network 2.

Referring back to FIG. 4, the start-up data 112 thus forwarded from the server 1 is received by the communications device 36 of the communications terminal 3, and therefrom, the start-up data 112 goes to the CPU 32 (step S402). To be specific, the CPU 32 analyzes the start-up data 112 after writing it onto the RAM 33 (step S403) In step S403, the CPU 32 determines which part of the start-up data 112 corresponds to what data, i.e., the application data 1121 to the public key 1125. The CPU 32 also defines the application data 1121 by file type.

Then, based on the analysis result of step S403, the CPU 32 determines whether the start-up data 112 includes the authentication type data 1123 (step S404). If determined No, the procedure goes to step S407. If Yes, the procedure goes to step S405, and the CPU 32 authenticates the authentication type data 1123.

Figure 7:
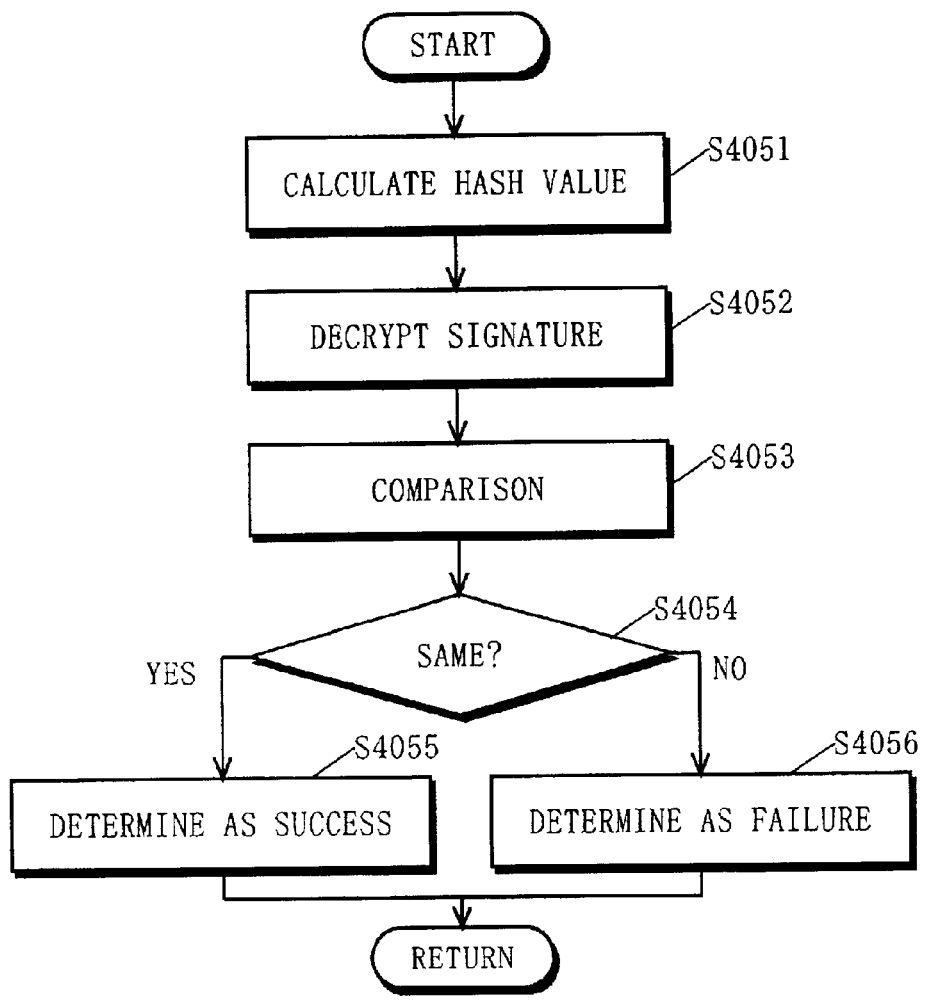
FIG. 7 is a detailed flowchart of subroutine step S405 of FIG. 4.

FIG. 7 is a detailed flowchart of subroutine step S405 of FIG. 4. In the data authentication process of FIG. 7, the CPU 32 executes any one predetermined authentication program among those stored in the storage device 31. The CPU 32 first calculates a hash value of the authentication type data 1123 (step S4051). Here, a hash function used for the purpose is the same as that used for deriving the signature of the authentication type data 1123 in the server 1. The CPU 32 then decrypts the signature of the authentication data 1124 (step S4052).

The CPU 32 then compares thus decrypted signature as being a hash value with the hash value calculated in step S4051 (step S4053). Through comparison as such, determined in step S4054 is the possibility of the authentication type data 1123 having been tampered, that is, whether the authentication type data 1123 received by the communications terminal 3 is the same as the authentication type data forwarded from the server 1.

If the hash value and the signature are determined as being the same in step S4054, the data authentication is regarded as a success (step S4055), and as a failure if not the same (step S4056).

After going through step S405 as such, the procedure goes to step S406 of FIG. 4. If the data authentication is determined as a failure in step S406, the procedure goes to step S410. If determined as a success, the CPU 32 authenticates the application data (step S407).

Figure 8:
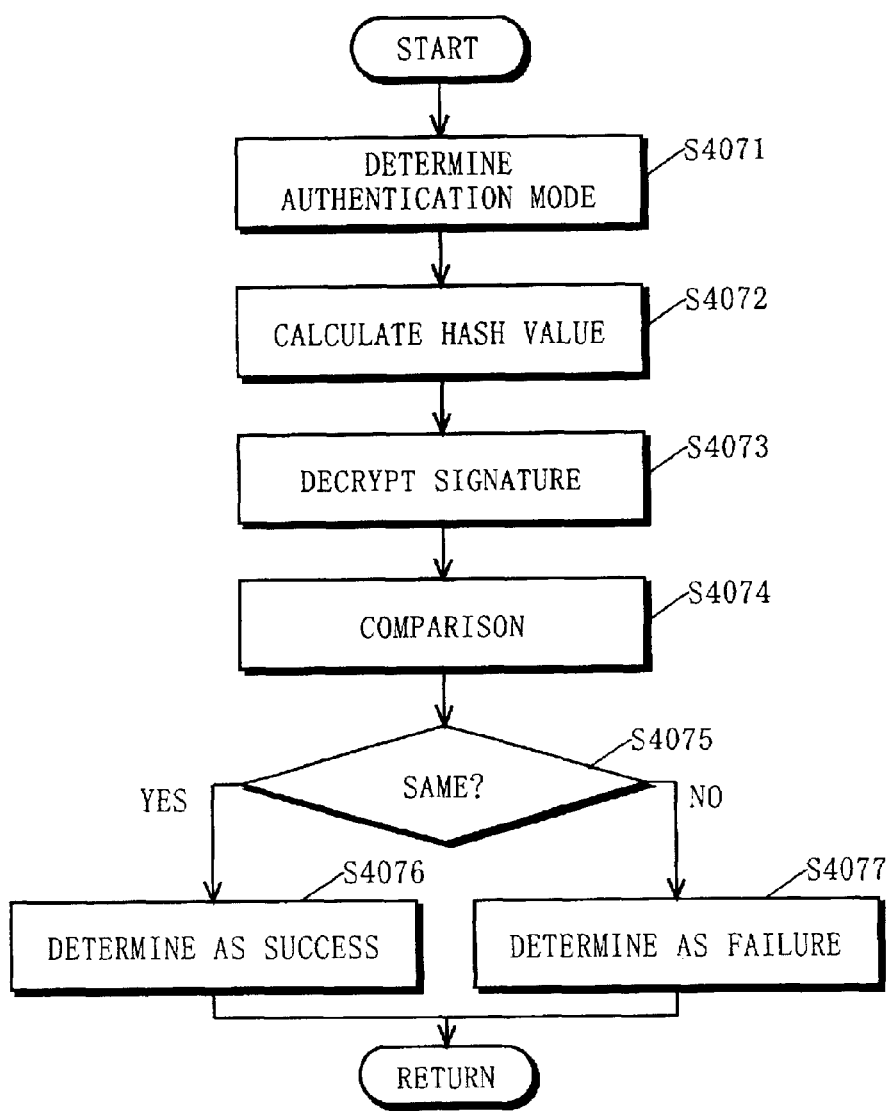
FIG. 8 is a detailed flowchart of subroutine step S407 of FIG. 4.

FIG. 8 is a detailed flowchart of subroutine step S407 of FIG. 4. The CPU 32 first determines in what mode the application data is to be authenticated (step S4071). If the authentication type data is determined as being included in step S404, the authentication mode indicated thereby is used. If not included, the application information table 315 stored in the storage device 31 is referred to for the purpose.

FIG. 9 shows an example of the application information table 315 of FIG. 3. As shown in FIG. 9, the application information table 315 shows the correspondence among an application name, a file type of application data, and an authentication mode. After a file type is defined for the application data in step S403, the corresponding application and authentication mode can be determined by simply referring to the application information table 315. For example, if the file type of the application data is defined as "C", the application to be started up is "A1", and the authentication mode is DES encryption.

After step S4071 is through as such, the procedure goes to step S4072 onward to S4077. Depending on what authentication mode is determined in step S4071, the authentication program to be executed by the CPU 32 in these steps may vary among those stored in the storage device 31.

Referring back to FIG. 8, the CPU 32 calculates a hash value of the application data 1121 (step S4072). Here, a hash function used for the purpose is the same one used for deriving the signature of the application data 1121 in the server 1. Then, the CPU 32 decrypts the signature of the application data 1122 (step S4073). In step S4073, since having been encrypted under public key cryptosystem, the signature of the application data 1122 is decrypted using the public key 1125. The CPU 32 then compares thus decrypted signature with the hash value calculated in step S4072 (step S4074), and determines whether those are the same or not (step S4075). If determined as being the same, the CPU 32 regards the data authentication as a success (step S4076) and as a failure if not the same(step S4077).

After going through step S407 as such, the procedure goes to step S408 of FIG. 4. If the data authentication is determined as a success in step S408, the procedure goes to step S409 to start up the application. Here, in step S409, the CPU 32 may change the contents of the application information table 315 based on the authentication type data 1123. If this is the case, the authentication mode for the next start-up data will be changed. If determined as a failure, on the other hand, the CPU 32 discards the start-up data (step S410). Through such processes, the application start-up process is completed.

In the present embodiment, the application data included in the start-up data and the authentication type data are authenticated separately. This is not restrictive, and if the start-up data includes the authentication type data, the next start-up data may be changed in authentication mode. In the below, a modified version of the application start-up process will be described.

Figure 10:
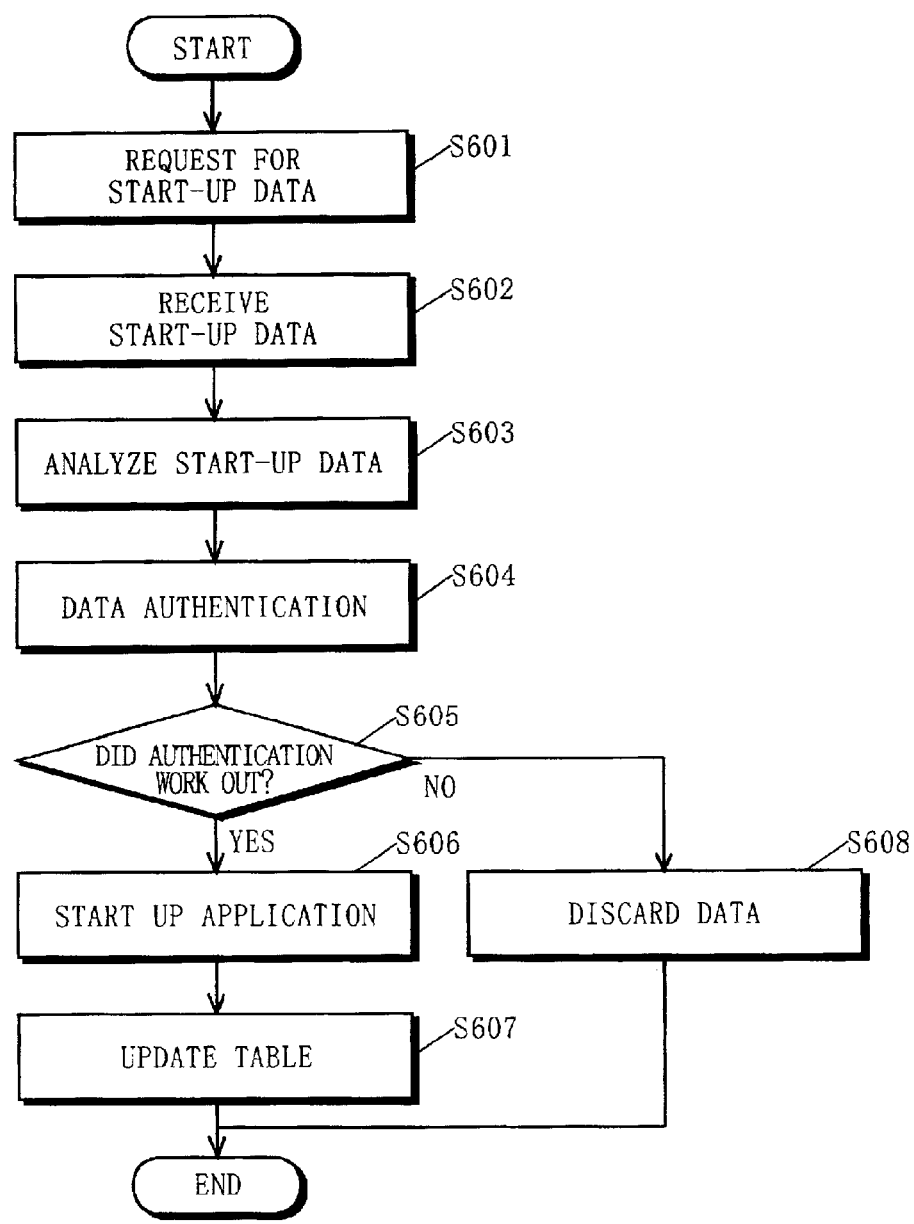
FIG. 10 is a flowchart of a modified version of the application start-up process of FIG. 4.

FIG. 10 is a flowchart of a modified version of the application start-up process of FIG. 4. Here, steps S601 to S603 are the same as steps S401 to S403 of FIG. 4, and thus not described again. In FIG. 10, after step S603, the CPU 32 performs data authentication (step S604). Here, in this modified example, the start-up data is subjected to data authentication in its entirety under the authentication mode determined based on the application information table 315. That is, the authentication mode used in step S604 has no relevance to the mode indicated by the authentication type data included in the start-up data.

The CPU 32 then determines whether data authentication in step S405 has worked out (step S605). If worked out, the CPU 32 starts up the application (step S606). Then, the CPU 32 updates the application information table (step S607). Specifically, therein, the authentication mode is updated into the one indicated by the authentication type data in the start-up data. More specifically, updated is the authentication mode corresponding to the application started up in step S606. If data authentication did not work out in step S605, the CPU 32 discards the start-up data (step S608). After such a sequence of processes, the application start-up process is through. Note that, in the processes shown in FIG. 10, the authentication mode will be changed by the time when the next start-up data comes.

The start-up data 112 is not limited in format, and may be described using hypertext, XML (extensible Markup Language), or SGML (Standard Generalized markup Language), or simply in a table format.

In the present embodiment, although the authentication mode is exemplified by a public key cryptosystem, any other cryptosystem will do, including DES (Data Encryption Standard), for example. Also, any authentication mode will do as long as data is authenticated thereby, including signature, digital watermarking, certificate, for example. Here, data is authenticated to be verified its identity, or the possibility of data tampering, for example.

In the present embodiment, the communications terminal 3 installs the application from the server 1. Described below is the operation of the communications terminal 3 for such application installment.

Figure 11:
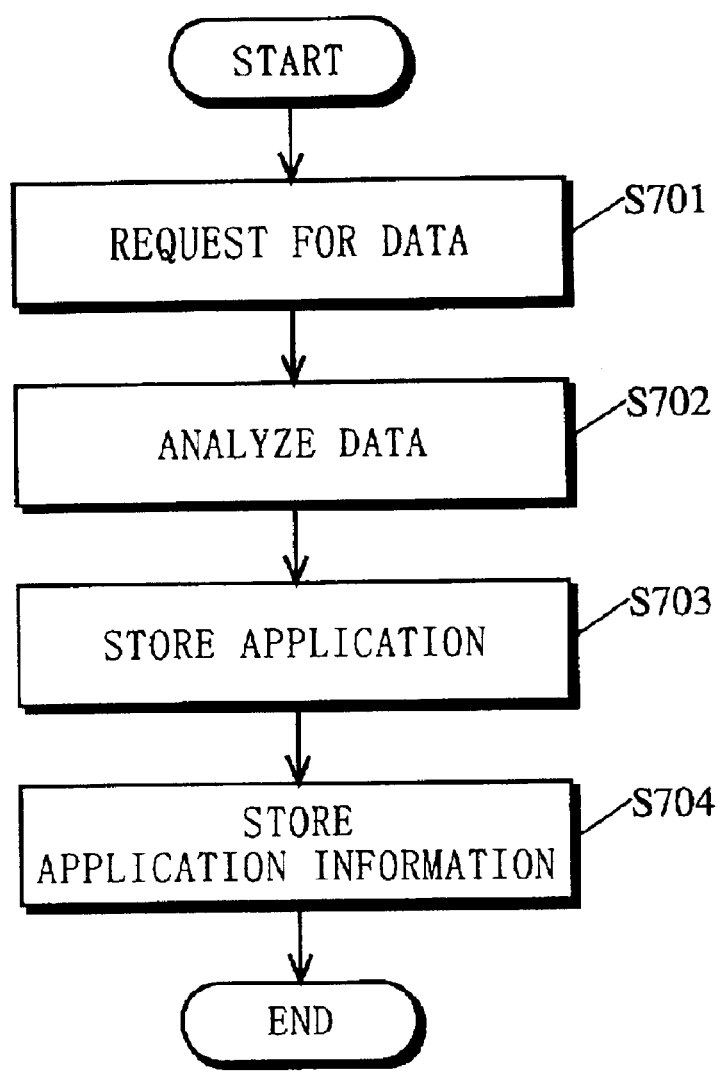
FIG. 11 is a flowchart of an application installment process in the communications terminal 3.

FIG. 11 is a flowchart showing an application installment process in the communications terminal 3. Here, presumably, the Web browser 311 is activated prior to the process. That is, by the time of application execution, the display device 35 will display a Web page received from the server 1 using the Web browser 311.

First, the CPU 32 of the communications terminal 3 requests the server 1 to forward the install data 111 (step S701). This data request is made through the input device 34, responding to the user's selecting anchor information on the Web page displayed as links. In other words, the CPU 32 goes through step S701 in response to user's operation as such. Here, the data request in step S701 includes a URL which indicates the location of the application program stored in the server 1. The anchor information is assumed to be displayed on the Web page under an application name.

The data request made in step S701 is received by the server 1 through the network 2. The communications device 14 of the server 1 transfers the received data request to the CPU 12. In response, the CPU 12 determines what install data is to be forwarded based on the URL included in the data request. In this example, the install data 111 will be forwarded.

Figure 12:
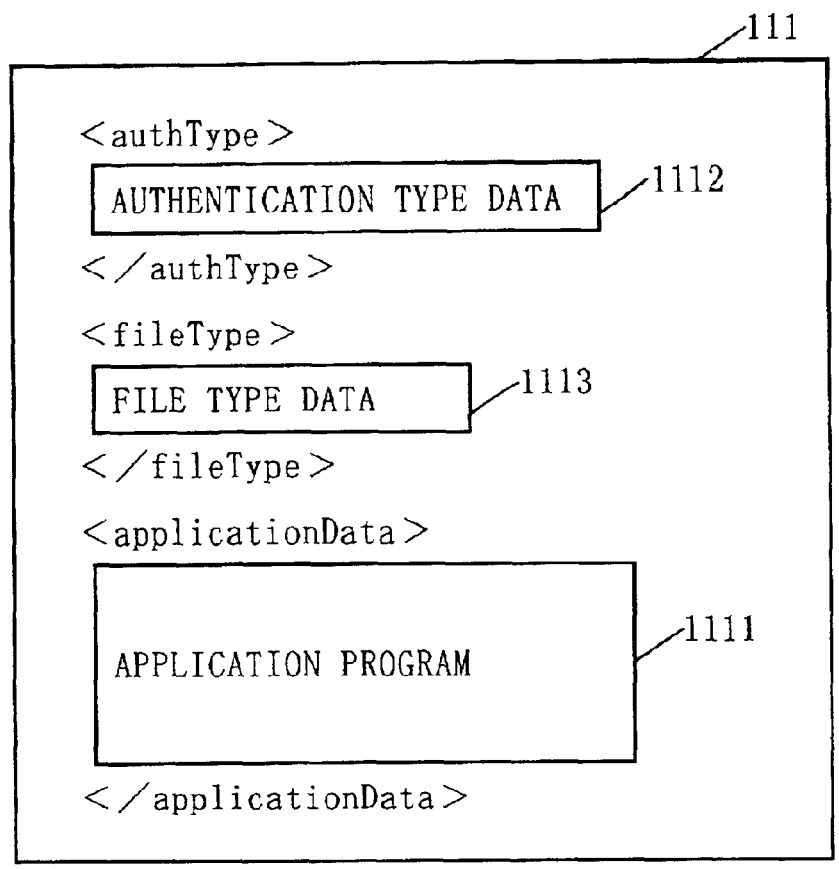
FIG. 12 exemplarily shows install data 111 of FIG. 1.

FIG. 12 shows an example of the install data 111 of FIG. 1. In FIG. 12, the install data 111 includes an application program 1111, authentication type data 1112, and file type data 1113. The application program 1111 is the one to be installed in the communications terminal 3. The authentication type data 1112 indicates in what mode the authentication is supposed to be done for starting up the application program 1111. The file type data 1113 indicates the file type of the application data to be read for starting up the application program 1111. In the present embodiment, the contents of the install data 111 are determined by referring to a table previously stored in the storage device 11 of the server 1. Here, presumably, the table shows the correspondence among an application program, authentication type data, and file type data. Here, the install data 111 may be generated by executing any dedicated program. The program is the one to go through a process of generating the install data by providing the application program with its corresponding authentication type data and file type data.

The CPU 12 then reads thus determined install data 111 from the storage device 11, and transfers it to the communications device 14. Thus transferred install data 111 is then sent out to the network 2.

The install data 111 is then received by the communications device 36 of the communications terminal 3 over the network 2. The CPU 32 analyzes the install data 111 after the communications device 36 writing it onto the RAM 33 (step S702) The CPU 32 determines which part of the install data 111 corresponds to what data, i.e., the application program 1111, the authentication type data 1112, and the file type data 1113.

Then, the CPU 32 stores the application program 1111 included in the install data 111 into the storage device 31 (step S703) The authentication type data 1112 and the file type data 1113 are stored into the application information table 315 (step S704). Through such operation, the application program 1111 is installed into the communications terminal 3.

Here, similarly to the start-up data, it is also preferable to perform data authentication to the install data coming from the server to the communications terminal. The authentication mode therefor may be unalterably predetermined as the one for the authentication type data in step S405 of FIG. 4, or changeable as the one for the start-up data in step S604 of FIG. 10.

As such, also at the time of application installment, the application and the data authentication program can be processed separately. Accordingly, prior to installment to the terminal, the data authentication process corresponding to the application can be easily changed in mode on the server side.

Note that, the install data 111 is presumed to be in a single file, but the application program 1111, the authentication type data 1112, and the file type data 1113 may be filed separately for the application installment process.

For application installment, the communications terminal 3 may download any corresponding applications from the server, or use recording media such as CD-ROMs for the purpose.

The present invention can be realized by programs, and easily embodied in any other independent computer systems with recording media having such programs recorded thereon.

While the invention has been described in detail, the foregoing description is in all aspects illustrative and not restrictive. It is understood that numerous other modifications and variations can be devised without departing from the scope of the invention.

What is claimed is:

1. A communications terminal for transmitting/receiving data to/from a server over a network, comprising:
    a data request section for making a data request for said server to forward start-up data which includes application data relating to start-up of an application, and authentication type data indicating an authentication mode for authenticating the application data;
    a data reception section for receiving said start-up data coming from said server in response to said data request;
    a first authentication section for authenticating said authentication type data received by said data reception section under a predetermined authentication mode;
    a second authentication section for authenticating, corresponding to said first authentication section succeeding in authentication, said application data received by said data reception section under an authentication mode indicated by the authentication type data which has been done with authentication; and
    an application start-up section for reading, corresponding to said second authentication section succeeding in authentication, said application data which has been done with authentication, and starting up said application.

2. The communications terminal according to claim 1, further comprising an application information storage section for storing application information which indicates a correspondence between the application and the authentication mode used for authenticating said application data relating to the application, wherein
    when said start-up data has none of said authentication type data, said second authentication section determines the authentication mode based on said application information.

3. The communications terminal according to claim 1, wherein by designating said application data stored in said server using a Web browser, said data request section makes the data request for the application data.

4. A communications terminal for transmitting/receiving data to/from a server over a network, comprising:
    a data request section for making a data request for said server to forward start-up data which at least includes application data relating to execution of an application;
    a data reception section for receiving said start-up data coming from said server in response to said data request;
    an application information storage section for storing application information which indicates a correspondence between the application and an authentication mode used for authenticating said application data relating to the application;
    an authentication section for authenticating said start-up data received by said data reception section under an authentication mode indicated by said application information;
    an application start-up section for reading, corresponding to said authentication section succeeding in authentication, the application data which has been done with authentication, and starting up said application; and
    under a condition that said start-up data includes both said application data and authentication type data which indicates an authentication mode used for authenticating the application data, an application information update section for updating, corresponding to said authentication section succeeding in authentication, the authentication mode in said application information stored in said application information storage section into the authentication mode indicated by the authentication type data which has been done with authentication.

5. A network system including a server and a communications terminal for data transmission/reception therebetween over a network, wherein
    said server comprises:
        a start-up data storage section for storing start-up data which includes application data relating to execution of an application, and authentication type data indicating an authentication mode used for authenticating the application data; and
        a data transmission section for forwarding the start-up data stored in said start-up data storage section in response to a data request for said start-up data coming from said communications terminal, and
    said communications terminal comprises:
        a data request section for making the data request for said start-up data;
        a data reception section for receiving the start-up data coming from said server in response to said data request;
        a first authentication section for authenticating said authentication type data received by said data reception section under a predetermined authentication mode;
        a second authentication section for authenticating, corresponding to said first authentication section succeeding in authentication, said application data received by said data reception section under the authentication mode indicated by the authentication type data which has been done with authentication; and
        an application start-up section for reading, corresponding to said second authentication section succeeding in authentication, the application data which has been done with authentication, and starting up said application.

6. A network system including a server and a communications terminal for data transmission/reception therebetween over a network, wherein
    said server comprises:
        a start-up data storage section for storing start-up data which at least includes application data relating to execution of an application; and
        a data transmission section for forwarding the start-up data stored in said start-up data storage section in response to a data request for said start-up data coming from said communications terminal, and
    said communications terminal comprises:
        a data request section for making the data request for said start-up data;
        a data reception section for receiving the start-up data coming from said server in response to said data request;
        an application information storage section for storing application information which indicates a correspondence between the application and an authentication mode used for authenticating said application data relating to the application,
        an authentication section for authenticating said start-up data received by said data reception section under the authentication mode indicated by said application information;

an application start-up section for reading, corresponding to said authentication section succeeding in authentication, said application data which has been done with authentication, and starting up said application; and under a condition that said start-up data includes both said application data and authentication type data which indicates an authentication mode used for authenticating the application data, an application information update section for updating, corresponding to said authentication section succeeding in authentication, the authentication mode in said application information stored in said application information storage section into the authentication mode indicated by the authentication type data which has been done with authentication.

7. A computer program embodied on a computer readable medium, said computer program for use with a computer operable in a communications terminal for transmitting/receiving data to/from a server over a network, said program comprising:

a data request step of making a data request for said server to forward start-up data which includes application data relating to start-up of an application, and authentication type data indicating an authentication mode for authenticating the application data;

a data reception step of receiving said start-up data coming from said server in response to said data request;

a first authentication step of authenticating said authentication type data received in said data reception step under a predetermined authentication mode;

a second authentication step of authenticating, corresponding to said first authentication step succeeding in authentication, said application data received in said data reception step under an authentication mode indicated by the authentication type data which has been done with authentication; and an application start-up step of reading, corresponding to said second authentication step succeeding in authentication, said application data which has been done with authentication, and starting up said application.

8. A computer program embodied on a computer readable medium, said computer program for use with a computer operable in a communications terminal for transmitting/receiving data to/from a server over a network, said program comprising:

said communications terminal previously includes application information which indicates a correspondence between an application and an authentication mode used for authenticating application data relating to the application, said program comprising:

a data request step of making a data request for said server to forward start-up data which at least includes the application data relating to execution of the application;

a data reception step of receiving said start-up data coming from said server in response to said data request;

an authentication step of authenticating said start-up data received in said data reception step under the authentication mode indicated by said application information;

an application start-up step for reading, corresponding to said authentication step succeeding in authentication, the application data which has been done with authentication, and starting up said application; and under a condition that said start-up data includes both said application data and authentication type data which indicates an authentication mode used for authenticating the application data, an application information update step of updating, corresponding to said authentication step succeeding in authentication, the authentication mode in said application information which has been previously included into the authentication mode indicated by the authentication type data which has been done with authentication.

9. A data authentication method used in a communications terminal for transmitting/receiving data to/from a server over a network, comprising:

a data request step of making a data request for said server to forward start-up data which includes application data relating to start-up of an application, and authentication type data indicating an authentication mode for authenticating the application data;

a data reception step of receiving said start-up data coming from said server in response to said data request;

a first authentication step of authenticating said authentication type data received in said data reception step under a predetermined authentication mode;

a second authentication step of authenticating, corresponding to said first authentication step succeeding in authentication, said application data received in said data reception step under an authentication mode indicated by the authentication type data which has been done with authentication; and an application start-up step of reading, corresponding to said second authentication step succeeding in authentication, said application data which has been done with authentication, and starting up said application.

10. A data authentication method used in a communications terminal for transmitting/receiving data to/from a server over a network, said communications terminal previously includes application information which indicates a correspondence between an application and an authentication mode used for authenticating application data relating to the application, said method comprising:

a data request step of making a data request for said server to forward start-up data which at least includes the application data relating to execution of the application;

a data reception step of receiving said start-up data coming from said server in response to said data request;

an authentication step of authenticating said start-up data received in said data reception step under the authentication mode indicated by said application information;

an application start-up step for reading, corresponding to said authentication step succeeding in authentication, the application data which has been done with authentication, and starting up said application; and under a condition that said start-up data includes both said application data and authentication type data which indicates an authentication mode used for authenticating the application data, an application information update step of updating, corresponding to said authentication step succeeding in authentication, the authentication mode in said application information which has been previously included into the authentication mode indicated by the authentication type data which has been done with authentication.

* * * * *

UNITED STATES PATENT AND TRADEMARK OFFICE
CERTIFICATE OF CORRECTION

PATENT NO. : 6,920,481 B2
DATED : July 19, 2005
INVENTOR(S) : Satoshi Inami et al.

It is certified that error appears in the above-identified patent and that said Letters Patent is hereby corrected as shown below:

Title page,
Item [56], References Cited, FOREIGN PATENT DOCUMENTS, insert the following:
-- EP    0706275    4/1996
   EP    1061430    12/2000 --.

Signed and Sealed this

Twenty-seventh Day of December, 2005

JON W. DUDAS
*Director of the United States Patent and Trademark Office*